(12) United States Patent
Kuo

(10) Patent No.: US 7,120,919 B2
(45) Date of Patent: Oct. 10, 2006

(54) DISK HOLDING DEVICE FOR OPTICAL DISK READING DEVICE

(75) Inventor: Tsung-Jung Kuo, Taipei (TW)

(73) Assignee: Lite-On It Corporation, Taipei (TW)

( * ) Notice: Subject to any disclaimer, the term of this patent is extended or adjusted under 35 U.S.C. 154(b) by 787 days.

(21) Appl. No.: 10/249,492

(22) Filed: Apr. 15, 2003

(65) Prior Publication Data

US 2004/0205790 A1    Oct. 14, 2004

(30) Foreign Application Priority Data

Jan. 10, 2003   (TW) .............................. 92100577 A

(51) Int. Cl.
*G11B 17/04* (2006.01)

(52) U.S. Cl. .................................... 720/620

(58) Field of Classification Search ................ 720/620, 720/621, 622, 623
See application file for complete search history.

(56) References Cited

U.S. PATENT DOCUMENTS

| | | | | |
|---|---|---|---|---|
| 5,113,388 | A * | 5/1992 | Yamada et al. .............. | 720/704 |
| 5,173,893 | A * | 12/1992 | Morikawa et al. ........... | 720/621 |
| 5,255,255 | A * | 10/1993 | Kaneda et al. .............. | 720/621 |
| 5,416,763 | A * | 5/1995 | Ohsaki ....................... | 720/623 |
| 6,512,730 | B1 * | 1/2003 | Lee et al. .................... | 720/622 |
| 6,782,545 | B1 * | 8/2004 | Kuo ............................ | 720/620 |
| 6,826,766 | B1 * | 11/2004 | Tuchiya ...................... | 720/620 |
| 6,930,970 | B1 * | 8/2005 | Kuo ............................ | 720/620 |
| 6,983,471 | B1 * | 1/2006 | Suzuki ........................ | 720/620 |
| 6,990,673 | B1 * | 1/2006 | Lee ............................. | 720/623 |
| 2003/0099182 | A1 * | 5/2003 | Maeda et al. .............. | 369/77.1 |

* cited by examiner

*Primary Examiner*—Hoa T. Nguyen
*Assistant Examiner*—Mark Blouin
(74) *Attorney, Agent, or Firm*—Winston Hsu

(57) ABSTRACT

The present invention is directed to a disk holding device for use in an optical disk reading device that accurately receives and positions an optical disk inserted into the optical disk reading device. The disk holding device comprises a substrate, a holding frame, two holding rods, two guide pins integrally formed on the corresponding holding rods and a sliding plate. Two gear racks are integrally formed with the holding frame, and the two spur gears are integrally formed on top surfaces of the holding rods. Thus, two spur gears of two holding rods respectively mesh the gear racks of the holding frame when the optical disk reading is in use. Further, the sliding plate functions to keep a positioning pin disposed on top surface of the holding rod in place, thereby causing the holding rods to be away from the optical disk when the optical disk reading device is in use. The disk holding device is adapted to receive and position the optical disk of different sizes even though the optical disk reading device is positioned vertically.

14 Claims, 9 Drawing Sheets

DISK HOLDING DEVICE FOR OPTICAL DISK READING DEVICE

BACKGROUND OF INVENTION

1. Field of the Invention

The present invention relates to an optical disk reading device, and in particular to a disk holding device for use in an optical disk reading device that can receive and position optical disks of different sizes while the optical disk reading device is positioned horizontally or vertically.

2. Description of the Prior Art

Slot-in optical disk drives allow users to conveniently load and unload optical disks. Slot-in optical disk drive can be implemented in various electronic devices, for example notebook computers and car CD players. Thus, the conventional slot-in optical disk drive 91 has the much more easier loading and unloading system for users to operate while the optical disk drive 91 is positioned horizontally, as shown in FIG. 1.

However, the conventional slot-in optical disk drive 91 has disadvantageous characteristics. For example, referring to FIG. 2, if the conventional slot-in disk drive 91 must be installed vertically in a computer system or due to limited installation space, then an opening 92 of the conventional slot-in disk drive 91 is positioned vertically. However, when the optical disk 9*a* is loaded into the conventional slot-in optical disk drive 91 that is positioned vertically, it is impossible for the conventional slot-in optical disk drive 91 to position and receive the optical disk 9*a* accurately. As a result, if the optical disk 9*a* is not positioned and received accurately, then it results in a reading failure when the conventional slot-in optical disk drive 91 attempts to read the optical disk 9*a*.

Accordingly, there is a need to develop an optical disk reading device that can receive and position optical disks while the optical disk reading device is positioned horizontally or vertically.

SUMMARY OF INVENTION

It is an object of the present invention to provide a disk holding device that can receive and position optical disks of different sizes while the optical disk reading device is positioned horizontally or vertically.

It is another object of the present invention to provide a disk holding device for use in an optical disk reading device that accurately receives and positions an optical disk inserted into the optical disk reading device.

The present invention provides an optical disk reading device having a disk holding device adapted to receive and position different types of optical disks. In one embodiment of the present invention, the disk holding device comprises a substrate, a holding frame, two holding rods, two guide pins integrally formed on the corresponding holding rods and a sliding plate. Two gear racks are integrally formed with the holding frame, and the two spur gears are integrally formed on top surfaces of the holding rods. Thus, two spur gears of two holding rods respectively mesh the gear racks of the holding frame when the optical disk reading is in use. Further, the sliding plate functions to keep a positioning pin disposed on top surface of the holding rod in place, thereby causing the holding rods to be away from the optical disk when the optical disk reading device is in use. The disk holding device is adapted to receive and position the optical disk of different sizes even though the optical disk reading device is positioned vertically.

The present invention may be implemented at low cost. Furthermore, the present invention can accurately receive and position optical disks of different standard sizes.

BRIEF DESCRIPTION OF DRAWINGS

The present invention can be fully understood from the following detailed description and preferred embodiment with reference to the accompanying drawings in which.

DETAILED DESCRIPTION

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the embodiments of the present invention are described below in connection with a slot-in optical disk drive, the present invention can be applied to all optical disk drive, including but not limited to CD-ROM drives, CD-RW drives, DVD-R/RW drives, COMBO drives, car audio drives, external drives, as well as all other optical media recorders and players.

Figure 1:
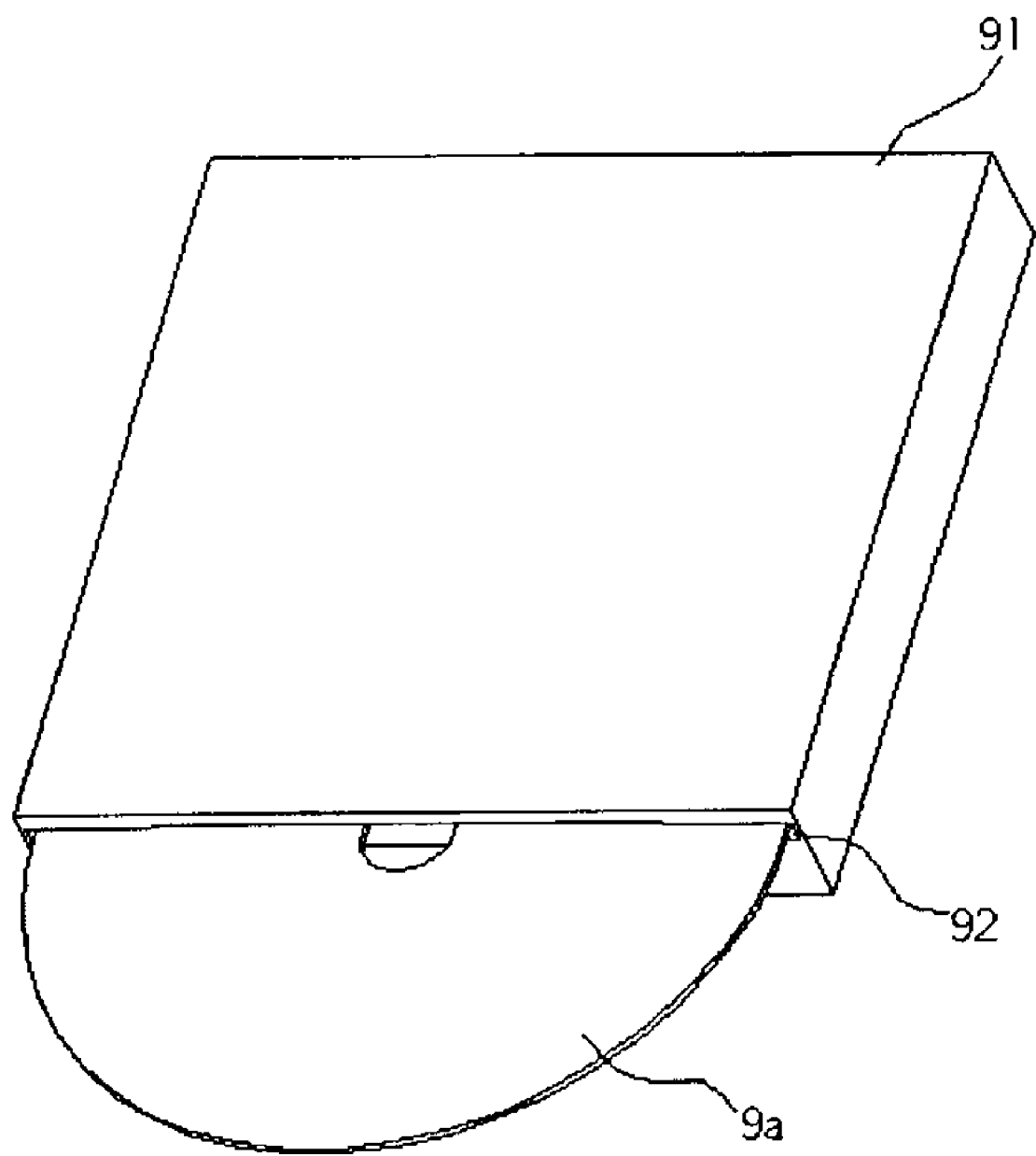
FIG. 1 is a perspective view of a conventional slot-in optical disk drive when the disk drive is positioned horizontally.
Figure 2:
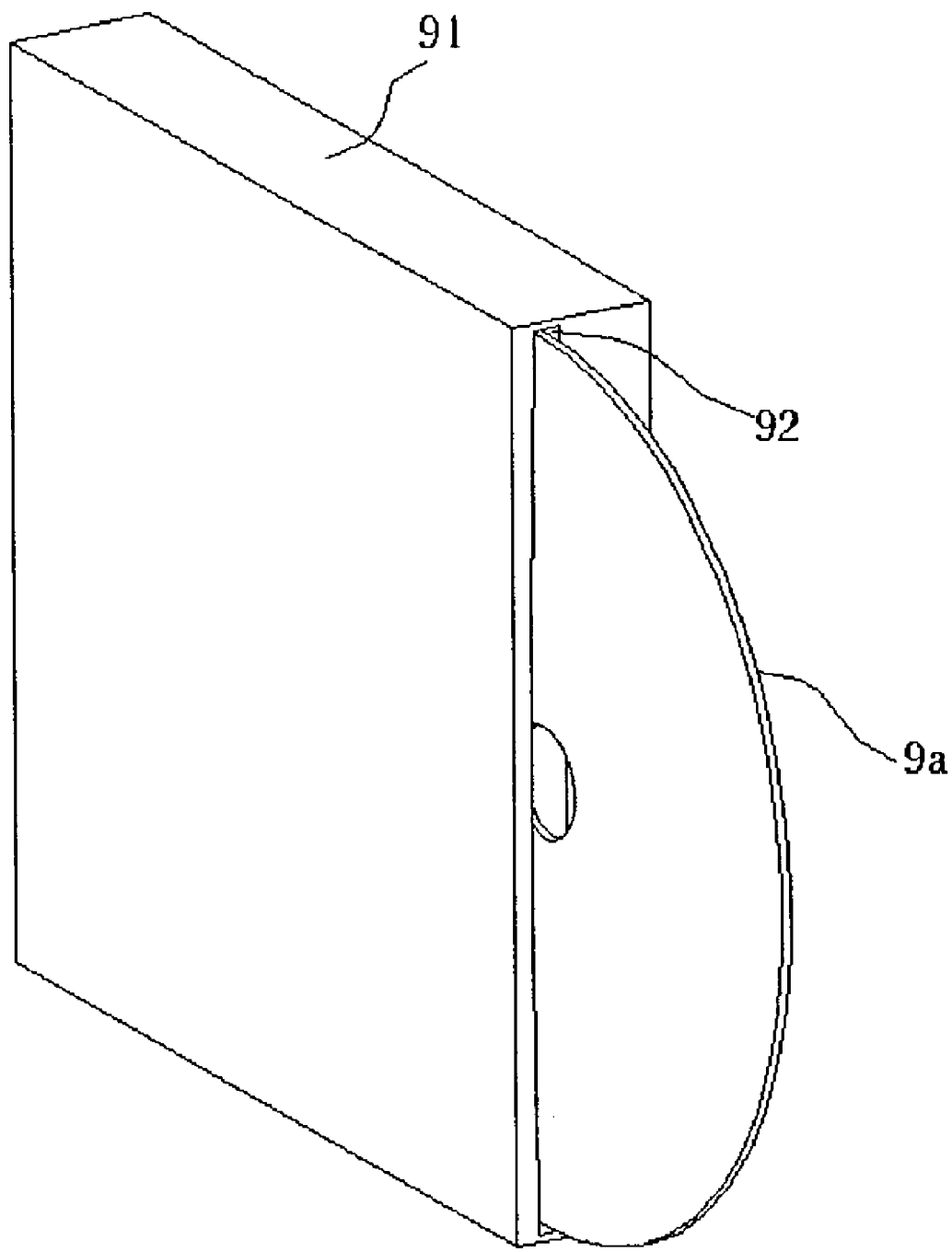
FIG. 2 is a perspective view of a conventional slot-in optical disk drive when the disk drive is positioned vertically.
Figure 3:
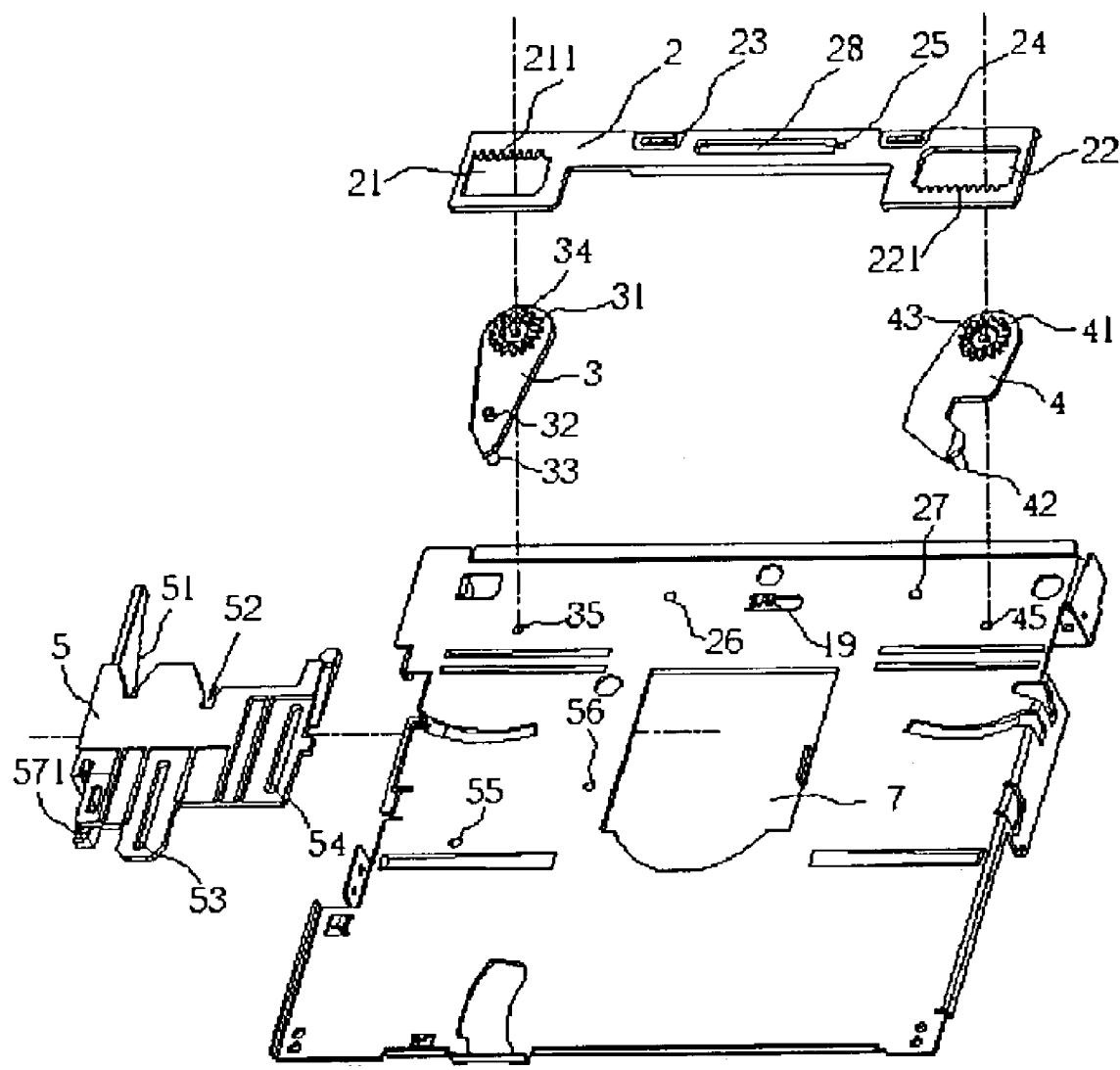
FIG. 3 is an exploded view of an optical disk reading device with a top cover and a bottom cover removed according to the present invention.
Figure 4:
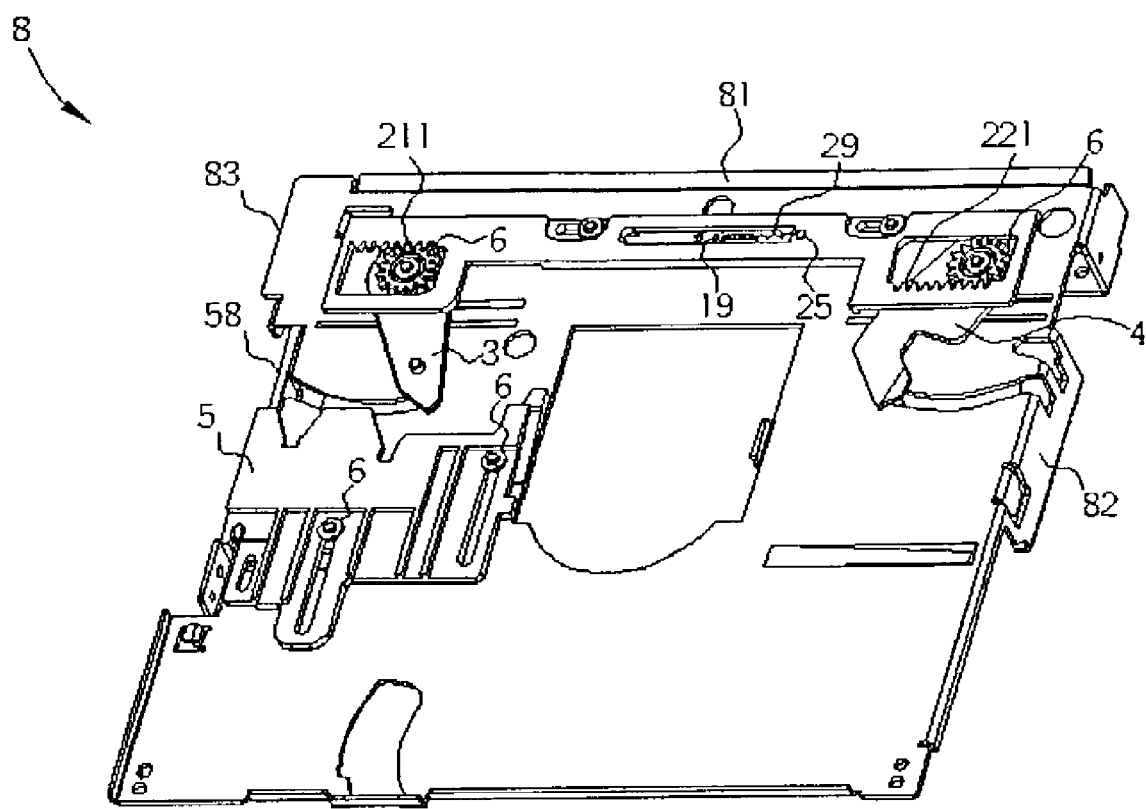
FIG. 4 is a perspective view of an optical disk reading device of FIG. 3.
Figure 5:
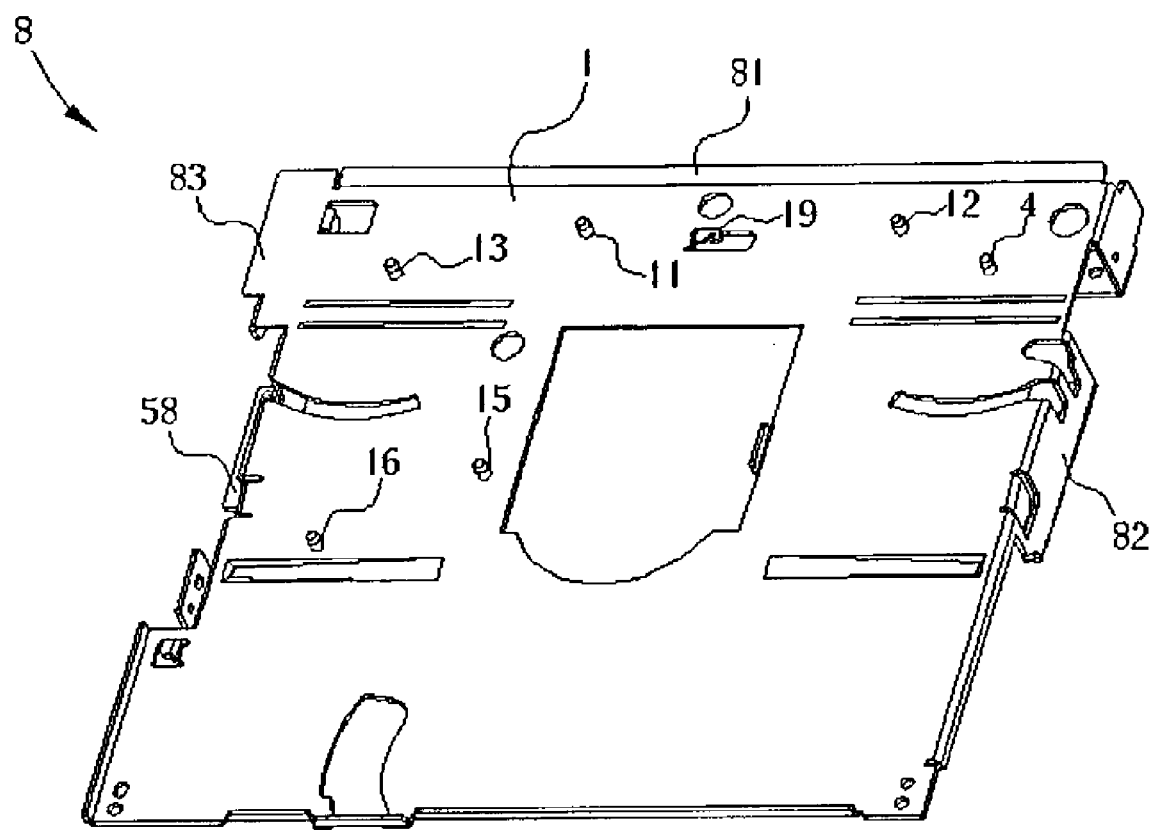
FIG. 5 is a perspective view of a substrate of the optical disk reading device of FIG. 3.

FIGS. 3–5 illustrate a disk holding device 8 of an optical disk reading device according to the present invention. FIG. 4 best illustrate the interconnections of the various components of the disk holding device 8 with respect to a substrate 1.

Referring to FIGS. 3–5, the disk holding device 8 according to the present invention has a substrate 1, a holding frame 2, a left holding rod 3, a right holding rod 4 and a sliding plate 5.

As shown in FIGS. 3 and 5, the substrate 1 has a central hole 7, a left guide groove 17 positioned at a left edge 83, a right guide groove 18 positioned at a right edge 82, a left rack positioning hole 26, a right rack positioning hole 27, a left puncture hole 35 and a right puncture hole 45. Elements indicated by numeral 26, 27, 35 and 45 are positioned near a front edge 81 of the substrate 1. The substrate 1 also has a left positioning hole 55, a right positioning hole 56 and a cut-out space 58 positioned along the left edge 83. The left positioning hole 55 is positioned near the left edge 83, and the right positioning hole 56 are positioned between the central hole 7 and the left positioning hole 55.

Referring to FIGS. 3 and 5, the holding frame 2 is a generally U-shaped component, and has a left opening 21, a right opening 22, OLE_LINK3*a* left holding groove 23, a right holding groove 24OLE_LINK3 and an elongated hole

28. A left gear rack 211 is integrally formed with the holding frame 2 and positioned within the left opening 21. Similarly, a left gear rack 221 is integrally formed with the holding frame 2 and positioned within the right opening 22. Further, a left rack guide pin 11 is fitted in the left rack positioning hole 26 and adapted to extend through the left holding groove 23. Similarly, a right rack guide pin 12 is fitted in the right rack positioning hole 27 and adapted to travel within and extend through the right holding groove 24.

Further referring to FIG. 3, the left holding rod 3 also has a left spur gear 31 positioned on its top surface, and the left spur gear 31 is adapted to travel within the left opening 21 and mesh the left gear rack 211. The left holding rod 3 also has a left guide pin 33 positioned on its button surface, and the left guide pin 33 is adapted to extend through and travel within the left guide groove 17. A positioning pin 32 is also defined on the top surface of the left holding rod 3 and positioned near the left guide pin 33. In addition, a left pivot 13 is fitted in the left puncture hole 35 and operatively couples a left positioning hole 34 that is provided at the center of the left spur gear 31 of the left holding g rod3. Thus, the left pivot 13 is pivotally connected to the left holding rod 3.

Similarly, the right holding rod 4 has a right spur gear 41 positioned on its top surface, and the right spur gear 41 is adapted to travel within the right opening 22 and mesh the right gear rack 221. The right holding rod 4 also has a right guide pin 42 positioned on its button surface, and the right guide pin 42 is adapted to extend through and travel within the right guide groove 18. Further, a right pivot 14 is fitted the right puncture hole 45 and operatively couples a right positioning hole 43 that is provided at the center of the right spur gear 41 of the right holding rod 4. Thus, the right pivot 14 is pivotally connected to the right holding rod 4.

In addition, a hole 25 is defined between the elongated hole 28 and the right holding groove 24, and a hook 19 is provided near the front edge 81 and adapted to extend through the elongated hole 28 when the insertion and ejection of the optical disk. An elastic member 29 connects the hole 25 of the holding frame 2 to the hook 19 of the substrate 1 and functions to normally bias the hole 25 toward the hook 19 of the substrate 1.

As shown in FIGS. 3 and 5, a sliding plate 5 has a left positioning notch 51, a right positioning notch 52, a left guide groove 53, a right guide groove 54 and a folded sidewall 57. A right positioning pin 15 is fitted in the right positioning hole 56 and adapted to travel through the right guide groove 54. Similarly, a left positioning pin 16 is fitted in the left positioning hole 55 and adapted to travel through the left guide groove 53.

Referring to FIGS. 3 and 4, the folded sidewall 57 is adapted to travel along the cut-out space 58 of the left edge 83 and includes a gear rack 571 that is used to engage with the transmission gear train (not shown) when the sliding plate 5 is pushed to move toward the front edge 81. The left positioning notch 51 and a right positioning notch 52 of the sliding plate 5 are respectively used to receive the positioning pin 32 when the optical disks of different sizes (for example, 12 cm disk or 8 cm disk) are inserted.

Referring to FIG. 4, as described above, the left holding rod 3 and the right holding rod 4 operatively couple with the holding frame 2, that is, the left and right spur gears 31 and 41 respectively engage with the left gear rack 211 and the right gear rack 221. The left rack guide pin 11, the right rack guide pin 12, the left pivot 13 and the right pivot 14 are respectively secured by a plurality of washers 6, thereby slidably fixing the holding frame 2 to the substrate 1.

Similarly, after the sliding plate 5 is slidably positioned on the substrate 1, the right positioning pin 15 and a left positioning pin 16 are respectively secured by a plurality of washers 6, thereby slidably fixing the sliding plate 5 to the substrate 1.

Figure 6:
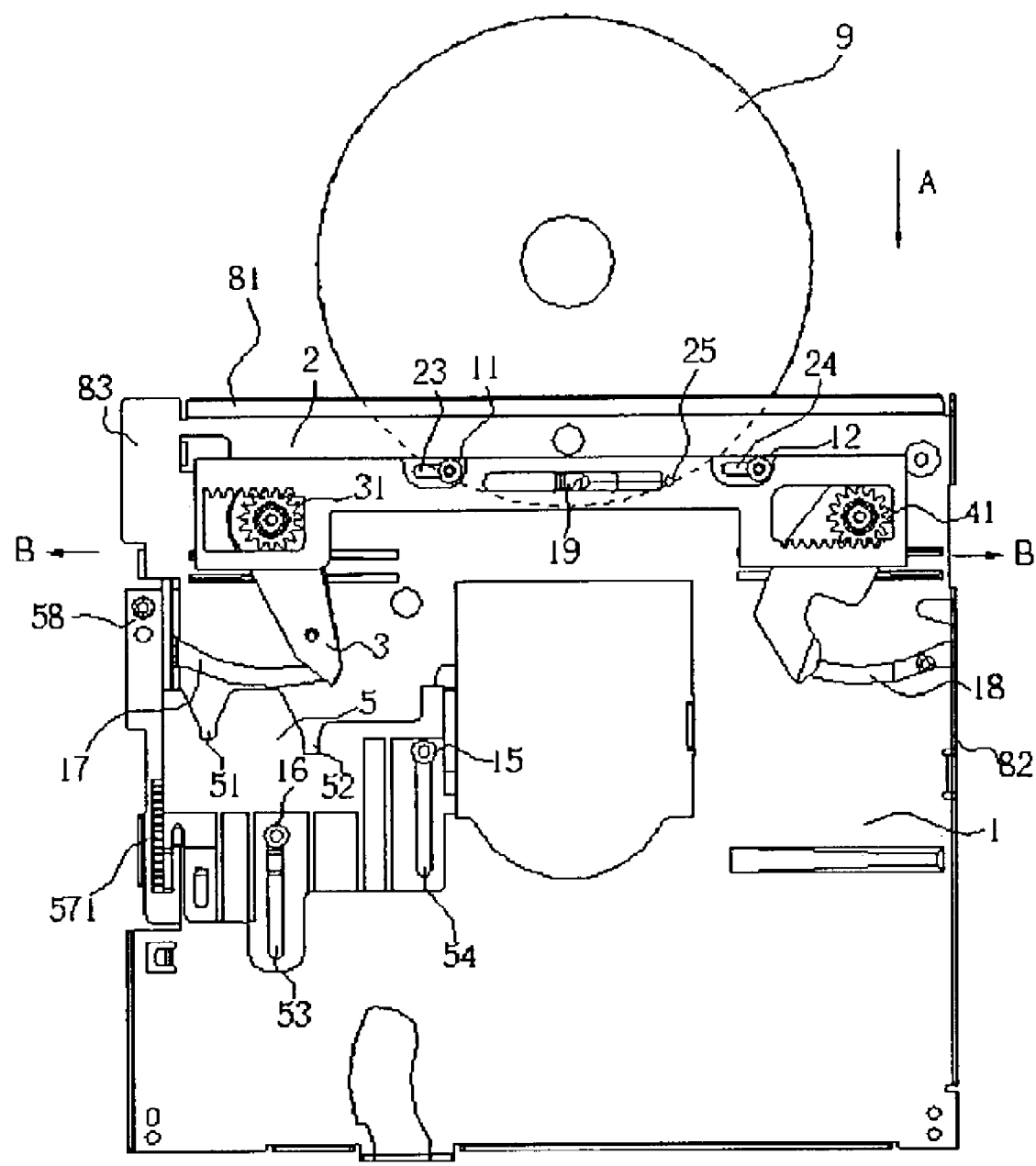
FIGS. 6 and 7 illustrate how an 8 cm optical disk can be inserted into the optical disk reading device of FIG. 3.
Figure 7:
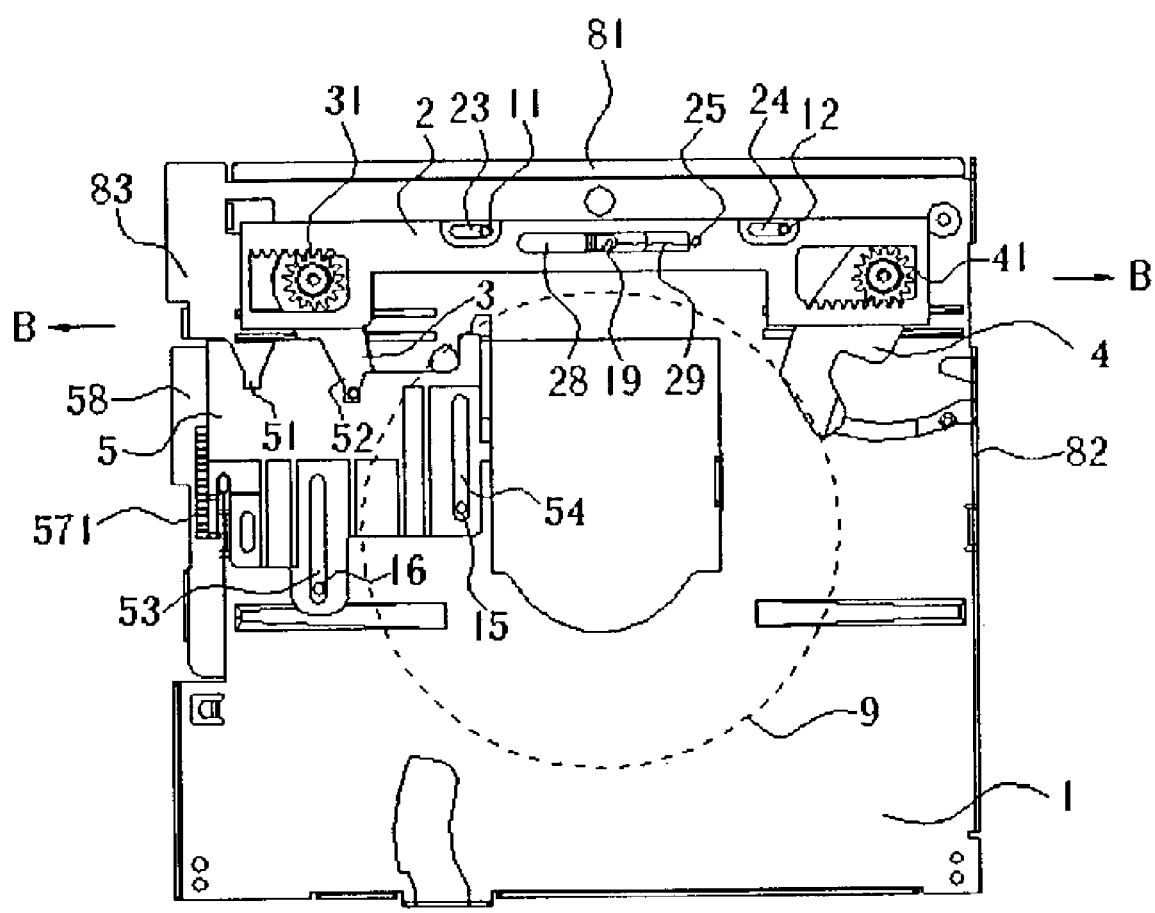

FIGS. 6 and 7 illustrate how an 8 cm disk 9 can be inserted into the optical disk reading device of FIG. 3. Referring to FIG. 6, the optical disk 9 (an 8 cm disk or a 12 cm disk) is inserted into the optical disk reading device in the direction of arrow A of FIG. 6. When the 8 cm disk 9 is inserted into the optical disk reading device and pulled by a roller mechanism (not shown), the 8 cm disk 9 will contact OLE_LINK2 the left guide pin 33 and the right guide pin 42OLE_LINK2. Meanwhile, the 8 cm disk 9 will push the left guide pin 33 and the right guide pin 42 outwardly in the direction of arrow B of FIG. 6. Therefore, the left holding rod 3 and the right holding rod 4 will respectively move along the left guide groove 17 and the right guide groove 18 for a distance.

As described above, the left spur gear 31 of the left holding rod 3 and the spur gear 41 of the right holding rod 4 respectively engage with the left gear rack 211 and the right gear rack 221 of the holding frame 2. When the left holding rod 3 and the right holding rod 4 will be pushed outwardly in the direction of arrow B of FIG. 6, the holding frame 2 will be pulled toward the right edge 82 of the substrate 1 and the elastic member 29 is elongated to overcome the movement of the holding frame 2 toward the right edge 82. Meanwhile, the left rack guide pin 11 and the right rack guide pin 12 are respectively moved away from the one end of the left holding groove 23 and the right holding groove 24. Due to the resilient force of the elastic member 29, the left guide pin 33 and the right guide pin 42 will abut and slide along the periphery of the 8 cm disk 9. As the 8 cm disk 9 is inserted further, the left holding rod 3 and the right holding rod 4 will be forcibly opened further. Finally, the periphery of the 8 cm disk 9 will trigger a switch mechanism (not shown) and come to stop. In this situation, the left guide pin 33 of the left holding rod 3 and the right guide pin 42 of the right holding rod 4 can keep the 8 cm disk 9 in place even when the optical disk reading device is positioned vertically.

Further, as shown in FIG. 6, the left positioning pin 16 and the right positioning pin 15 respectively contact the one end of the left guide groove 53 and the right guide groove 54 of the sliding plate 5. Referring to FIG. 7, the sliding plate 5 will be pushed forwardly (toward the front edge 81) for a certain distance and the gear rack 571 positioned in the folded sidewall 57 will engage with a gear transmission (not shown) so that the sliding plate 5 will be pulled forwardly along the cut-out space 58. Meanwhile, when the sliding plate 5 keeps on moving forwardly, the positioning pin 32 of the left holding rod 3will be pulled slight outwardly and be moved along the right positioning notch 52 so that the left guide pin 33 of the left holding rod 3 does not contact the periphery of the 8 cm disk 9 when the 8 cm disk begins to spin. Besides, the right holding rod 4 will be pulled outwardly because of interconnections between the holding frame 2 and the left holding rod 3 and the right holding rod 4.

During the ejection of 8 cm disk 9, the sliding plate 5 is pulled rearwardly by the gear transmission (not shown) until the left positioning pin 16 and the right positioning pin 15 respectively contact the original ends of the left guide groove 53 and the right guide groove 54 again, as shown in FIG. 6. Meanwhile, the 8 cm disk 9 is pulled out of the substrate 1 by a roller mechanism (not shown). Therefore, the left guide pin 33 and the right guide pin 42 will abut and slide along the periphery of the 8 cm disk 9, and the left holding rod 3 and the right holding rod 4 will pivot in the reverse direction of arrow B. Finally, the 8 cm disk 9 leaves the optical disk reading device, and the left rack guide pin 11 and the right rack guide pin 12 respectively contact the original ends of the left holding groove 23 and the right holding groove 24. The holding frame 2 returns to the initial position because of the resilient force of the elastic member 29.

Figure 8:
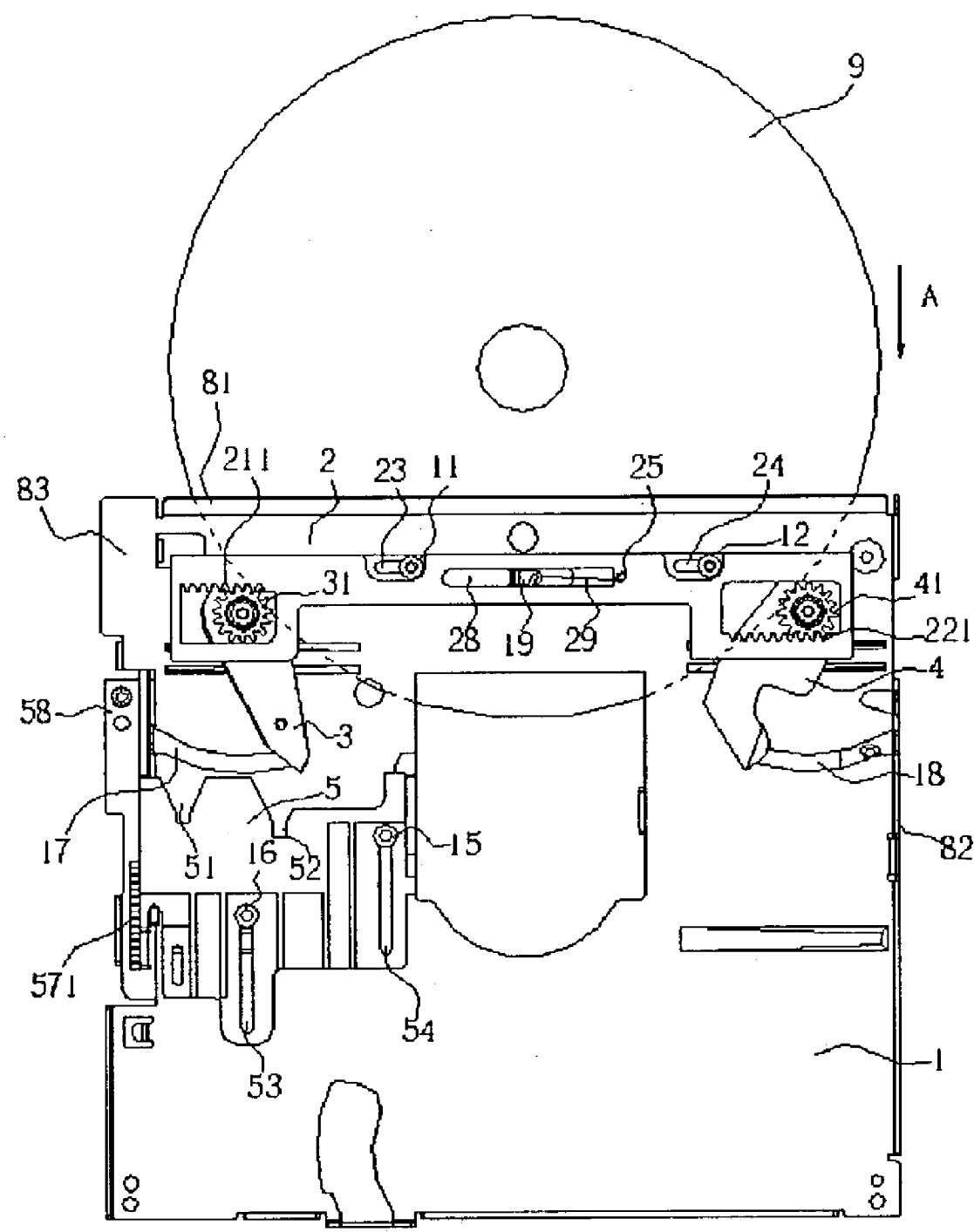
FIGS. 8 and 9 illustrate how a 12 cm optical disk can be inserted into the optical disk reading device of FIG. 3.
Figure 9:
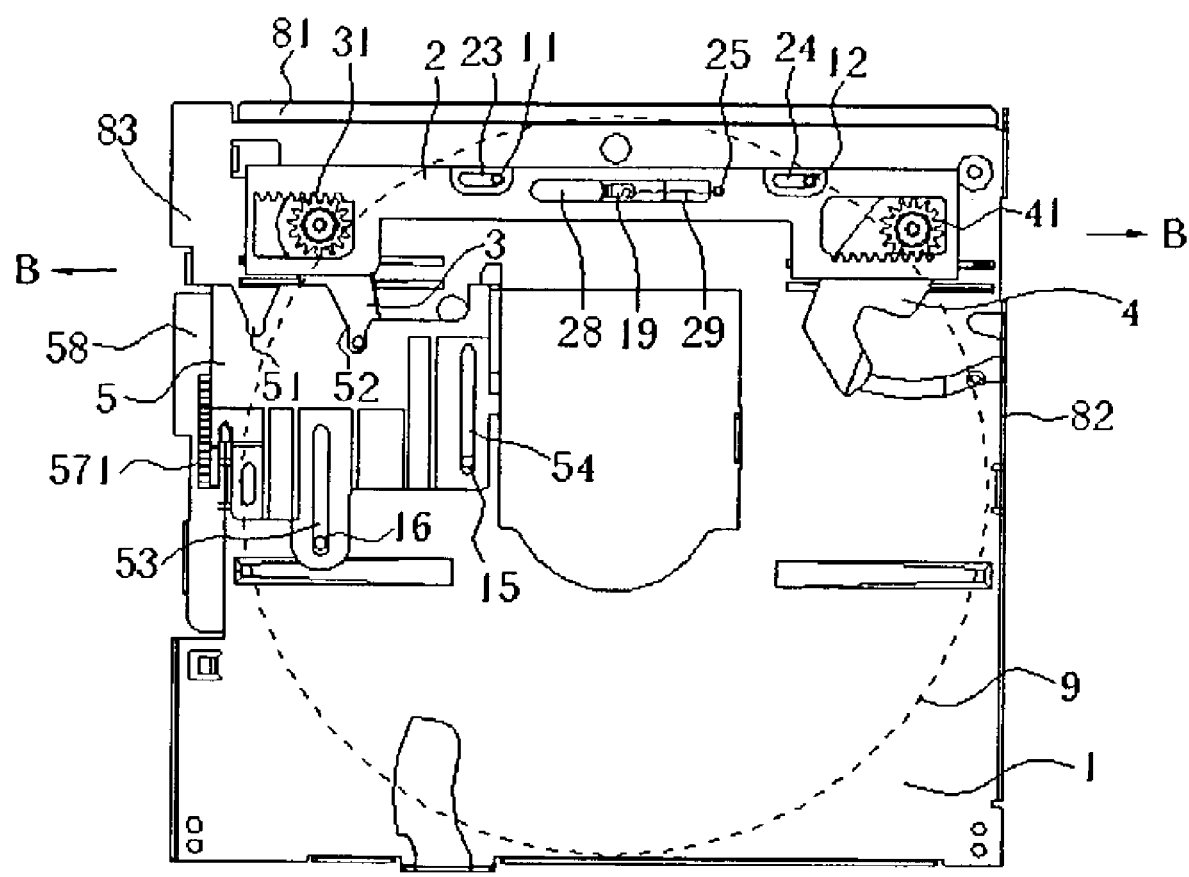

FIGS. 8–9 illustrate how a 12 cm disk 9 can be inserted into the optical disk reading device of FIG. 3. Like the insertion of the 8 cm disk, the 12 cm disk is inserted into the optical disk reading device in the direction of arrow A of FIG. 8. When the 12 cm disk 9 is pulled by a roller mechanism (not shown) and inserted into the optical disk reading device, the 12 cm disk 9 will contact the left guide pin 33 and the right guide pin 42. Meanwhile, the 12 cm disk 9 will push the left guide pin 33 and the right guide pin 42 outwardly in the direction of arrow B of FIG. 8. Therefore, the left holding rod 3 and the right holding rod 4 will respectively move along the left guide groove 17 and the right guide groove 18 for a longer distance because of the larger diameter of 12 cm disk 9.

As described above, referring to FIG. 8, the left spur gear 31 of the left holding rod 3 and the right spur gear 41 of the right holding rod 4 respectively engage with the left gear rack 211 and the right gear rack 221 of the holding frame 2. When the left holding rod 3 and the right holding rod 4 will be pushed outwardly in the direction of arrow B of FIG. 8, the holding frame 2 will be forced toward the right edge 82 of the substrate 1 and the elastic member 29 is elongated to overcome the movement of the holding frame 2 toward the right edge 82. Meanwhile, the left rack guide pin 11 and the right rack guide pin 12 are respectively moved away from the one end of the left holding groove 23 and the right holding groove 24. Due to the resilient force of the elastic member 29, the left guide pin 33 and the right guide pin 42 will abut and slide along the periphery of the 12 cm disk. As the 12 cm disk 9 is inserted further, the left holding rod 3 and the right holding rod 4 will be forcibly opened further. Finally, the periphery of the 12 cm disk 9 will trigger a switch mechanism (not shown) and come to stop. Like the insertion of the 8 cm disk, the left guide pin 33 of the left holding rod 3 and the right guide pin 42 of the right holding rod 4 can keep the 12 cm disk 9 in place even when the optical disk reading device is positioned vertically.

Further, as shown in FIG. 8, the left positioning pin 16 and the right positioning pin 15 respectively contact the one ends of the left guide groove 53 and the right guide groove 54 of the sliding plate 5. Referring to FIG. 9, the sliding plate 5 will be pushed forwardly (toward the front edge 81) for a certain distance and the gear rack 571 positioned in the folded sidewall 57 will engage with a gear transmission (not shown) so that the sliding plate 5 will be pulled forwardly along the cut-out space 58. Meanwhile, when the sliding plate 5 keeps on moving forwardly, the positioning pin 32 of the left holding rod 3 will be pulled outwardly and be moved along the left positioning notch 51 because of a larger diameter of 12 cm disk 9. Thus, the left guide pin 33 of the left holding rod 3 does not contact the periphery of the 12 cm disk 9 when the 12 cm disk begins to spin. Besides, the right holding rod 4 will be pulled outwardly because of interconnections between the holding frame 2 and the left holding rod 3 and the right holding rod 4.

During the ejection of 12 cm disk 9, the sliding plate 5 is pulled rearwardly by the gear transmission (not shown) until the left positioning pin 16 and the right positioning pin 15 respectively contact the original ends of the left guide groove 53 and the right guide groove 54 again, as shown in FIG. 8. Meanwhile, the 12 cm disk 9 is pulled out of the substrate 1 by a roller mechanism (not shown). Therefore, the left guide pin 33 and the right guide pin 42 will abut and slide along the periphery of the 12 cm disk 9, and the left guide pin 33 and the right guide pin 42 will pivot in the reverse direction of arrow B of FIG. 8. Finally, the 12 cm disk 9 leaves the optical disk reading device, and the left rack guide pin 11 and the right rack guide pin 12 respectively contact the original ends of the left holding groove 23 and the right holding groove 24. The holding frame 2 returns to the initial position because of the resilient force of the elastic member 29.

In conclusion, the present invention utilizes the left holding rod 3, the right holding rod 4 and the sliding plate 5 to receive and position both a 12 cm disk and an 8 cm disk in the optical disk drive that is positioned horizontally or vertically.

While the invention has been described with reference to a preferred embodiment, the description is not intended to be construed in a limiting sense. It is therefore contemplated that the appended claims will cover any such modifications or embodiments as may fall within the scope of the invention defined by the following claims and their equivalents.

What is claimed is:

1. A disk holding device for use in an optical disk reading device, comprising:
    a substrate having a plurality of guide grooves;
    a first holding rod, positioned on the substrate and having a first guide pin and a first spur gear, the first guide pin adapted to extend through one of the guide grooves;
    a second holding rod, positioned on the substrate and having a second guide pin and a second spur gear, the second guide pin adapted to extend through one of the guide grooves;
    a holding frame having a first gear rack and a second gear rack, the first spur gear and the second spur gear respectively adapted to engage with the first gear rack and the second gear rack; and
    a elastic member, connected between the holding frame and the substrate to bias the holding frame.

2. The disk holding device as claimed in claim 1, wherein the substrate comprises a pivot and the first holding rod is pivotally coupled to the pivot.

3. The disk holding device as claimed in claim 1, wherein the substrate comprises a pivot and the second holding rod is pivotally coupled to the pivot.

4. The disk holding device as claimed in claim 1, wherein the elastic member is a spring that is metallic or plastic.

5. The disk holding device as claimed in claim 1, wherein the substrate has a hook and the holding frame has a hole, and the elastic member is connected the hole of the holding frame to the hook of the substrate.

6. The disk holding device as claimed in claim 1, wherein the first guide pin and the second guide pin contact the periphery of a disk during its insertion or ejection.

7. The disk holding device as claimed in claim 1, further comprising a sliding plate having two positioning notches, and the first guide pin further having a positioning pin.

8. The disk holding device as claimed in claim 7, wherein the positioning pin moves along one of the positioning notches when an disk is inserted, and the positioning pin moves along the other positioning notch when an disk with a larger diameter is inserted.

9. The disk holding device as claimed in claim 7, wherein the sliding plate has two guide grooves and the substrate further comprises two positioning pins, and the two positioning pins are adapted to extend through the guide grooves when the sliding plate moves with respect to the substrate.

10. A disk holding device for use in an optical disk reading device, comprising:
- a substrate having a plurality of guide grooves and pivots;
- a first holding rod, pivotally connected to one of the pivots and having a first guide pin, a positioning pin and a first spur gear, the first guide pin adapted to extending through one of the guide grooves;
- a second holding rod, pivotally connected one of the pivots and having a second guide pin and a second spur gear, the second guide pin adapted to extend through one of the guide grooves;
- a holding frame, a first gear rack and a second gear rack, the first spur gear and the second spur gear respectively adapted to engage with the first gear rack and the second gear rack;
- a sliding plate having a first and a second positioning notches, the positioning pin moves along the first positioning notch when an disk is inserted and the positioning pins moves along the second positioning notch when an disk with a larger diameter is inserted; and
- a elastic member, connected between the holding frame and the substrate to bias the holding frame.

11. The disk holding device as claimed in claim 10, wherein the substrate has a hook and the holding frame has a hole, and an elastic member is connected between the hook and the hole to bias the holding frame.

12. The disk holding device as claimed in claim 10, wherein the elastic member is a spring that is metallic or plastic.

13. The disk holding device as claimed in claim 10, wherein the first guide pin and the second guide pin contact the periphery of a disk during its insertion or ejection.

14. The disk holding device as claimed in claim 10, wherein the sliding plate has two guide grooves and the substrate further comprises two positioning pins, and the two positioning pins are adapted to extend through the guide grooves when the sliding plate moves with respect to the substrate.

* * * * *